United States Patent [19]

Brecht

[11] 4,259,391
[45] Mar. 31, 1981

[54] INDICIA BEARING PLASTIC LAMINATE AND METHOD OF PRODUCING SAME

[76] Inventor: Frederick R. Brecht, 3241 Duncan Ave., Sarasota, Fla. 33579

[21] Appl. No.: 955,790

[22] Filed: Oct. 30, 1978

[51] Int. Cl.$^3$ .......................... B32B 3/00; B41M 3/14
[52] U.S. Cl. ...................................... 428/195; 427/7; 427/161; 427/164; 428/203; 428/916
[58] Field of Search ............... 428/916, 195, 202–207; 427/7, 161, 164; 96/46

[56] References Cited

U.S. PATENT DOCUMENTS

| | | | |
|---|---|---|---|
| 2,334,962 | 11/1943 | Seitz | 96/46 |
| 2,361,670 | 10/1944 | Whitehead | 428/916 X |
| 3,046,832 | 7/1962 | Winzenburg | 96/46 X |
| 3,391,479 | 7/1968 | Buzzell et al. | 427/7 X |
| 3,674,622 | 7/1972 | Plasse | 428/916 X |
| 3,874,979 | 4/1975 | Hannon | 428/916 X |
| 4,094,679 | 6/1978 | Washizawa et al. | 96/46 X |
| 4,096,015 | 6/1978 | Kawamata et al. | 428/916 X |
| 4,153,457 | 5/1979 | Kellie | 96/46 |

Primary Examiner—Thomas J. Herbert, Jr.
Attorney, Agent, or Firm—Hauke and Patalidis

[57] ABSTRACT

A transparent indicia bearing plastic laminate embodying in one integral portion thereof general information and in firmly bonded relation therewith a second portion incorporating specific data directed to a particular individual and which may be a medical history and a photograph, or as an alternative, product specifications and various other forms of visual data. The novel article of this invention is produced by a minimum number of relatively simple and low-cost steps by locating in one section of a carrier member a portrayal of general information such as organization or corporation identity or the like, and in a second section of the carrier member specific data which may include the individual's medical history and photograph accompanied by a fraud-proof signature, or for other applications, product description and operating data, or if a credit card is the purpose, account number, financial background, photograph and signature. The carrier member is sequentially exposed to a 35 mm. camera at approximately a 25 to 1 reduction ratio, and the pair of microfilm negative frames thus exposed, after conventional processing steps, are laminated to produce a transparent plastic card, thereby eliminating the need for a cardboard backing, typing and substantial equipment and manpower requirements as well as producng an identification card which is tamper-proof and provides a vast store of information data when read in available viewing equipment.

3 Claims, 5 Drawing Figures

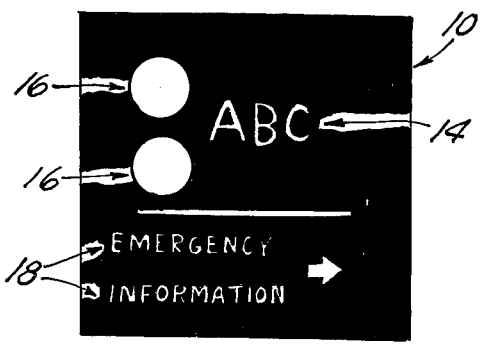
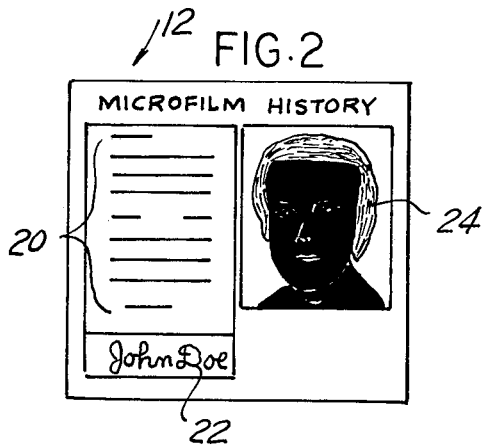
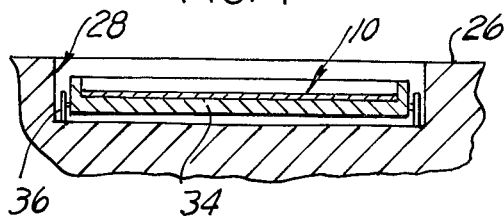
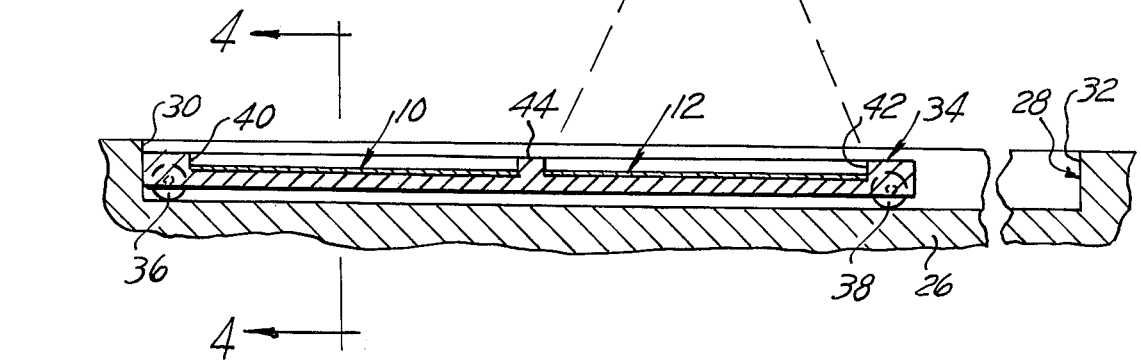
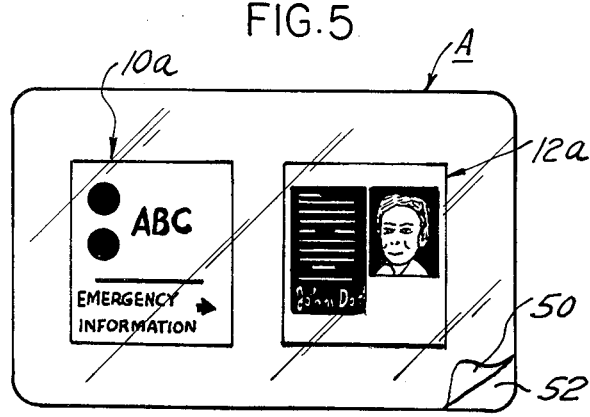

INDICIA BEARING PLASTIC LAMINATE AND METHOD OF PRODUCING SAME

BACKGROUND OF THE INVENTION

It is known in the art to which this invention pertains to provide an indicia bearing plastic laminate for personal identification purposes in which there is utilized a cardboard base having an aperture therein to accommodate a 16 mm. film chip bearing the requisite data, whether it be medical history or other information, and adjacent to this aperture is a section upon which is typed or printed the individual's name and such information as home address, telephone number and the like. With this information in place, lamination can then be effected. However, the utilization of a cardboard base and the procedure described entails a substantial expenditure in materials, equipment and other outlay. The necessary typing is subject to inaccuracies, and there is always the possibility that the film chip and name of the party may not correspond. Further, it is always possible that any provision for signature corresponding to the other indicia on the card might be fraudulent. Additionally, and more importantly, when a cardboard base is employed, the resulting object is essentially opaque, and therefore reading by means of a microfilm viewer is impossible. It is believed that it will be apparent as the description proceeds that all of the structural and operational disadvantages of the prior art have been effectively obviated by the present invention.

SUMMARY OF THE PRESENT INVENTION

The instant invention is directed to a method of making an essentially transparent indicia bearing plastic laminate, and to the article resulting therefrom, which includes disposing at a predetermined location upon a movable supporting surface an image of a logo or art work presenting generalized information, locating in another preselected space upon the support documents containing detailed information, such as a medical history and a photograph, then causing the movable and supporting surface to be transported beneath a 35 mm. planetary camera having about a 25 to 1 reduction ratio to produce a negative image in sequence of the general and specific information upon the supporting surface, subjecting the negative so obtained to the conventional photographic steps of developing, fixing and bleaching, and then firmly bonding the negative between predetermined lengths of thermoplastic film, laminating the same and severing the lengths into card-size objects. It is believed quite apparent from the brief description thus far given that the instant process is characterized by relatively low manufacturing costs utilizing a minimum of personnel and equipment, the elimination of conventional cardboard stock base and associated typing step in prior art techniques, resulting in the avoidance of any tampering with the indicia produced, and also the achievement of a product having much superior readability. Specific means to accomplish these desired objectives will be manifest as the description proceeds.

BRIEF DESCRIPTION OF THE DRAWINGS

FIG. 1 is a top plan view of an example of art work or logo which may be utilized in the process of this invention;

FIG. 2 is a top plan view of an example of specific data serving to illustrate a portion of the ultimate laminate of this invention;

FIG. 3 is a schematic side elevational view, partly in section, illustrating the photographic step of the invention;

FIG. 4 is a fragmentary sectional view through the apparatus of FIG. 3, taken substantially along the line 4—4 of FIG. 3; and FIG. 5 is a top plan view of the article produced by the process concept of the invention.

DETAILED DESCRIPTION OF THE PREFERRED EMBODIMENTS

Referring now to the drawings, there is shown at FIG. 1 an arbitrarily chosen logo member 10 and at FIG. 2 an example of information data member 12. The logo member 10 may incorporate therein a group, club, association, organization or corporation identification 14 and a trademark or symbol 16. In the event that the transparent indicia bearing plastic laminate of this invention is to be used as a medical history and identification card, the purpose thereof may be so indicated on the logo bearing member 10 by the indicia designated at 18 of FIG. 1. The logo member 10 is preferably in the form of a negative, in the photographic sense, namely it is a negative of the logo information that is eventually to appear on the indicia bearing plastic laminate (FIG. 5).

As will be apparent as the description proceeds, the novel article and process concepts of this invention have numerous applications. For example, it is within the contemplation of the invention that the indicia bearing plastic laminate herein disclosed may contain reproductions of important papers and documents recorded by microfilming on a pocket-size plastic card, lists of household items and serial numbers, a description of valuable jewelry, insurance policy information and numbers. As another example of use, a card could be produced which would list an individual's credit card numbers, driver's license and auto tag numbers. In other words, any item of which a permanent microfilm record is desired may be produced by this invention. However, and not by way of limitation, the drawings and present description set forth herein are specifically directed to medical history data for illustration purpose.

Referring now again to FIG. 2, the data member 12 incorporates an emergency data section 20 and a large scale signature portion 22. The emergency data portion 20 generally includes such information as blood type, the bearer's name, address, birth date, next of kin, and a wide range of other pertinent data such as susceptibility to various drugs and past medical history. By utilization of the novel concepts of this invention, the data portion 20 of the data member 12 is normally lettersize and typewritten, and it can thus be appreciated that voluminous medical history data can be embodied and effectively reproduced by microfilming techniques. The data portion 22 is preferably in a positive form, in the photographic sense, and is a printed form, for example, having a plurality of preprinted information categories with blank spaces for filling data appropriate to a particular individual. As illustrated in FIG. 2, the data member 12 would also normally include a preferably negative photograph 24 of the individual bearing the card.

In FIGS. 3 and 4 of the drawings there is schematically represented an exemplary apparatus for producing the article A or identification card of FIG. 5. The apparatus of this invention comprises a stationary support 26 taking the form of a table or the like, the upper surface of which is longitudinally recessed as at 28 to provide at opposite ends thereof vertical abutments or stops 30 and 32. Horizontally movable within the cavity or recess 28 is a carrier member 34 supporting on opposite sides roller members 36 and 38 designed to travel upon the surfaces of the cavity 28 and actuated either by hand or motor means. The carrier member 34 is contoured upon its upper surface to provide a pair of recesses or pockets 40 and 42 separated by a central divider portion 44 and adapted to receive the indicia bearing members 10 and 12, respectively, of FIGS. 1 and 2. The carrier member 34 is preferably printed in matt black and the data members 10 and 12, in the pockets 40 and 42, may be held flat against the bottom of the pockets by panes of non-reflective glass or other suitable transparent material, not shown.

The apparatus effective to accomplish the novel purposes of the invention includes a conventional microfilm camera 46 having a lens 46a, the camera 46 accommodating a continuous photographic film strip 48 adequately shielded from ambient light by being disposed in an appropriate magazine or on a reel mounted within the camera body.

As is believed to be now manifest from the foregoing description when taken in connection with the drawings, the logo member 10 and the data member 12 are placed at their appropriate locations in the pockets 40 and 42 of the carrier member 34 and after displacing the member 34, mounted on the rollers 36 and 38, manually or by motor means, sequentially in engagement with the abutments 32 and 30, the positive members 10 and 12 are sequentially photographed by the camera 46 to provide on the film 48 a pair of consecutive exposed frames in the form of negative image transparencies which after appropriate processing, are ultimately a part of the article A. Referring now again to FIG. 5 of the drawings, the negative logo transparency is designated therein generally by the numeral 10a and the negative data transparency by the legend 12a. Each transparency 10a and 12a of course bear the indicia from FIGS. 1 and 2, but in negative resemblance, and the negative transparencies 10a and 12a, which may be left integral with each other as two consecutive frames of the processed appropriate section of microfilm, are permanently laminated in tamper-proof fashion between the thermoplastic films 50 and 52. The films 50 and 52 may be provided by any one of a number of thermoplastics, and at present any one of the acrylics are preferred.

It is readily apparent that the resulting article A can be made at high production rates by automated equipment and is made in a convenient wallet-size, preferably in the same size as conventional credit cards and the like.

I claim:

1. A wallet-size identification card made of a partially transparent indicia bearing plastic laminate, said identification card comprising at least a pair of transparent thermoplastic layers edge-bonded to one another by heat sealing and at least one photographic transparency disposed between said thermoplastic layers within the bonded edge thereof, said photographic transparency bearing first indicia normally readable by the naked eye and second indicia not readable by the naked eye, said photographic transparency being a photographic reproduction of an original information member bearing said first indicia in a size substantially larger than the size of said second indicia, said photographic reproduction transparency reduced to an appropriate size such as to render said second indicia not readable by the naked eye while permitting said first indicia to remain readable by the naked eye wherein said photographic transparency is a microfilm having at least two portions, one of said portions bearing data information in the form of said first indicia normally readable by the naked eye and indicating membership in a particular group of individuals and the other of said portions bearing data information pertaining to a specific individual in said group in the form of said second indicia not readable by the naked eye.

2. The identification card of claim 1 further comprising in said data information pertaining to said specific individual a reproduction of the handwritten signature of said individual at a size adequate to render said signature readable by the naked eye.

3. A method of producing an identification card in the form of a partially transparent indicia bearing plastic laminate which comprises a photographic transparency bearing first indicia normally readable by the naked eye and second indicia not readable by the naked eye, said method comprising the steps of locating upon a non-reflective supporting surface at least one data information member bearing said first indicia and said second indicia, exposing said data information member to a microfilm photographic camera for obtaining a photographic reproduction of said data information member at a reduced size on a length of photographic film, processing said length of photographic film to obtain a photographic transparency, and laminating said photographic transparency between a pair of transparent thermoplastic sheets of a size larger than said photographic transparency, said transparency being a photographic reproduction of said data information member reduced in size to approximately 1/25 of the size of said data information member such as to render said second indicia not readable by the naked eye.

* * * * *